US010417452B2

(12) United States Patent
Hillman

(10) Patent No.: US 10,417,452 B2
(45) Date of Patent: Sep. 17, 2019

(54) NET2CORE A SERVER APPLICATION DESIGN FRAMEWORK THAT FACILITATES ACCESS TO INFORMATION, AND PROTECTS INFORMATION FROM UNAUTHORISED ACCESS, THROUGH THE WORLD WIDE WEB

(71) Applicant: C.J.H. Management Services PTY LTD, Kambah, ACT (AU)

(72) Inventor: Chris Hillman, Kambah (AU)

(73) Assignee: Parametric Systems Pty Ltd, Kambah (AU)

( * ) Notice: Subject to any disclaimer, the term of this patent is extended or adjusted under 35 U.S.C. 154(b) by 0 days.

(21) Appl. No.: 15/515,689

(22) PCT Filed: Jun. 15, 2015

(86) PCT No.: PCT/AU2015/000342
§ 371 (c)(1),
(2) Date: Mar. 30, 2017

(87) PCT Pub. No.: WO2016/058024
PCT Pub. Date: Apr. 21, 2016

(65) Prior Publication Data
US 2017/0308718 A1 Oct. 26, 2017

(30) Foreign Application Priority Data
Oct. 15, 2014 (AU) .................. 2014101252

(51) Int. Cl.
*H04L 29/06* (2006.01)
*G06F 21/62* (2013.01)
*H04W 12/08* (2009.01)
(52) U.S. Cl.
CPC ......... *G06F 21/6263* (2013.01); *H04W 12/08* (2013.01)

(58) Field of Classification Search
None
See application file for complete search history.

(56) References Cited

U.S. PATENT DOCUMENTS 6,253,326 B1 * 6/2001 Lincke ............... H04L 29/06
726/12
6,389,462 B1 * 5/2002 Cohen ............... H04L 29/06
707/999.01

(Continued)

OTHER PUBLICATIONS

Hur, Junbeom. Improving Security and Efficiency in Attribute-Based Data Sharing. IEEE Transactions on Knowledge and Data Engineering, vol. 25, Issue: 10. https://ieeexplore.ieee.org/stamp/stamp.jsp?tp=&arnumber=5740890 (Year: 2011).*

(Continued)

*Primary Examiner* — Jeremiah L Avery
(74) *Attorney, Agent, or Firm* — Harness, Dickey & Pierce, P.L.C.

(57) ABSTRACT

Net2Core is a Server Application Design Framework that provides inherent security for information due to its tripartite structure. The Net2Core Server Application Design Framework consists of a Server process (the "Net Process") that is accessible by a Client; a Server process that is responsible for all Application information processing (the "Core Process") which is inaccessible directly by a Client; and a Storage medium to pass requests to the "Core Process" from the "Net Process" and to pass results provided by the "Core Process" to the "Net Process". Additional to the request/response interaction of the "Net Process" to/from the "Core Process" through the Storage, there is also direct communication from the "Net Process" to signal the "Core Process" of the need for operation and from the "Core Process" to the "Net Process" to signal "Core Process" completion. All communications are synchronised so that the Net2Core Server Application Design Framework can (Continued)

Figure 1:
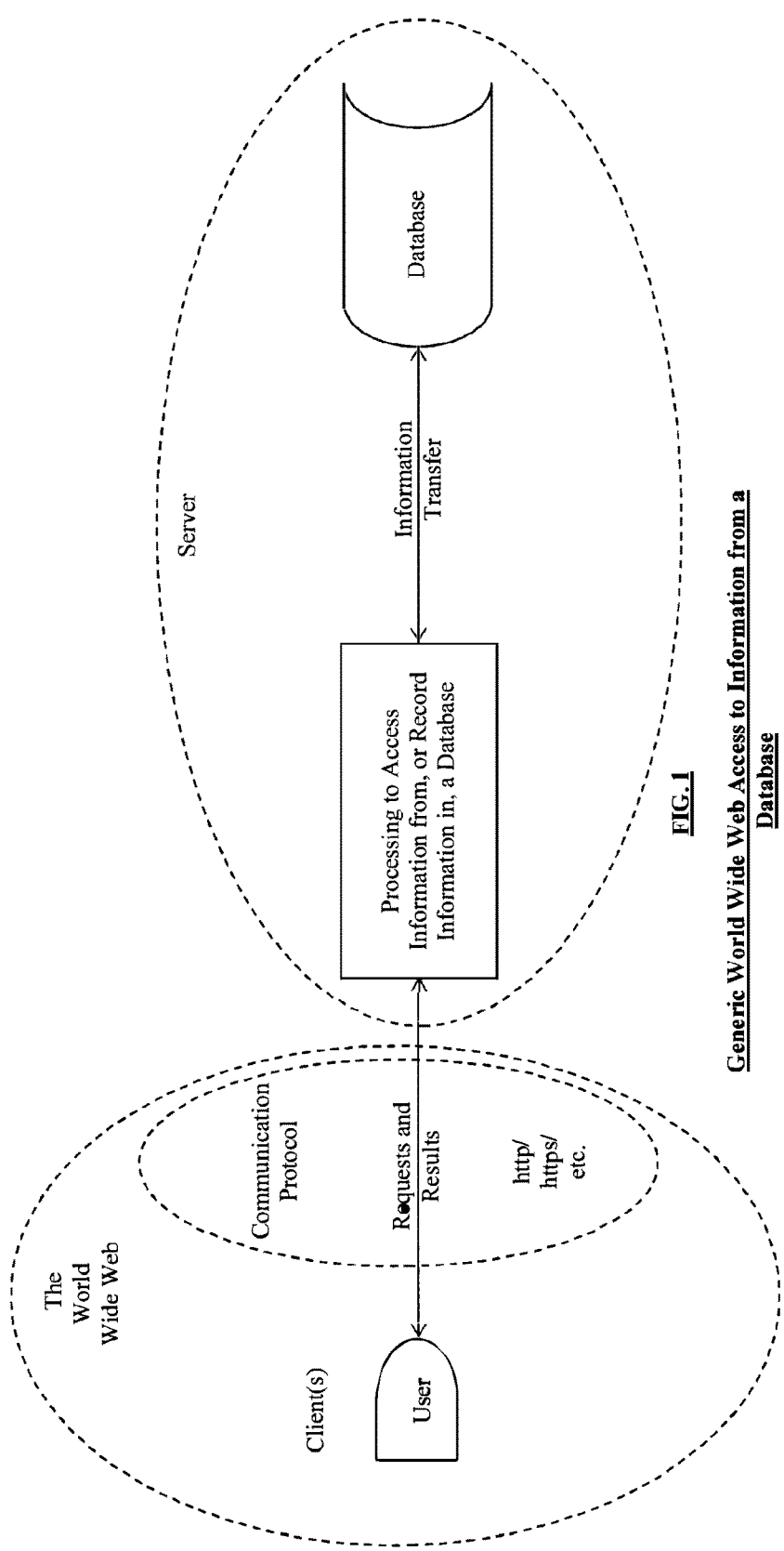
Figure 2:
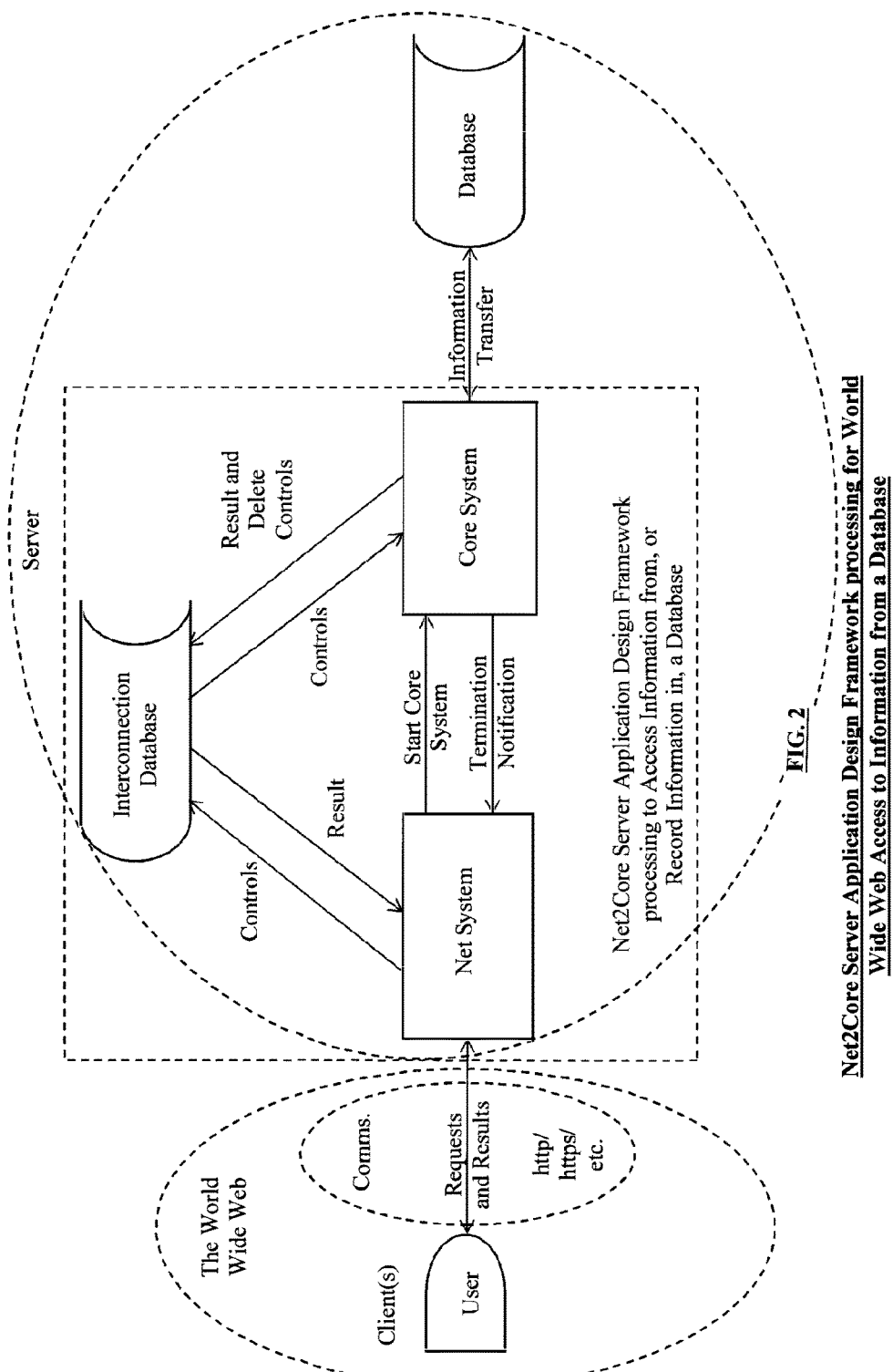
Figure 3:
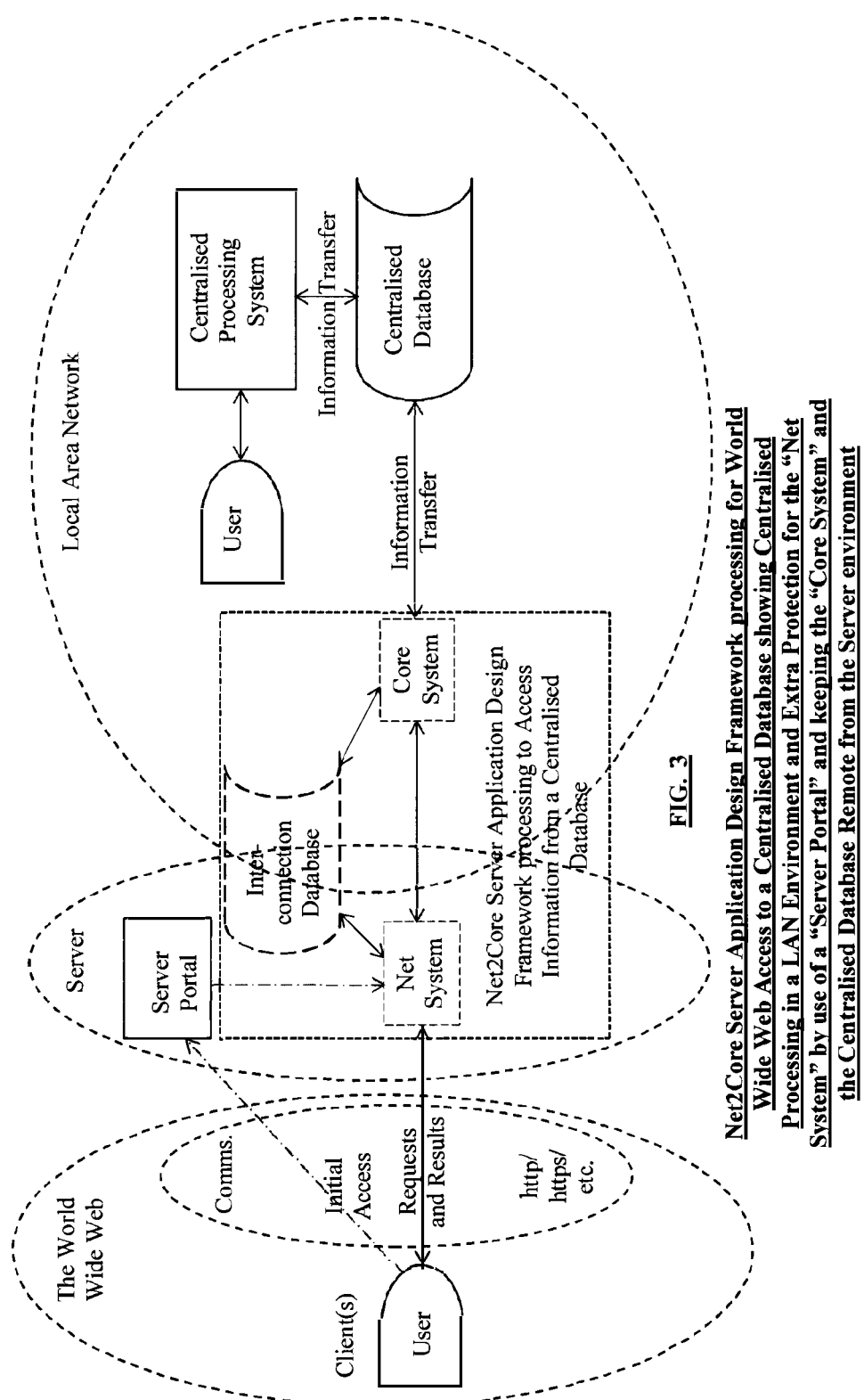

Net2Core Server Application Design Framework processing for World Wide Web Access to a Centralised Database showing Centralised Processing in a LAN Environment and Extra Protection for the "Net System" by use of a "Server Portal" and keeping the "Core System" and the Centralised Database Remote from the Server environment provide the Design Framework for any Server Application in a typical Client/Server environment.

6 Claims, 3 Drawing Sheets

(56) References Cited

U.S. PATENT DOCUMENTS

| | | | | |
|---|---|---|---|---|
| 6,820,082 | B1* | 11/2004 | Cook | G06F 21/6227 |
| | | | | 707/754 |
| 7,263,717 | B1* | 8/2007 | Boydstun | H04L 63/08 |
| | | | | 707/999.009 |
| 7,437,550 | B2* | 10/2008 | Savage | G06Q 20/383 |
| | | | | 713/156 |
| 7,441,265 | B2* | 10/2008 | Staamann | G06F 9/465 |
| | | | | 709/229 |
| 7,603,408 | B1* | 10/2009 | McGinnis | H03M 7/30 |
| | | | | 709/203 |
| 8,856,869 | B1* | 10/2014 | Brinskelle | H04L 63/08 |
| | | | | 726/12 |
| 2002/0035685 | A1 | 3/2002 | Ono et al. | |
| 2003/0217162 | A1* | 11/2003 | Fu | H04L 29/06 |
| | | | | 709/229 |
| 2004/0250059 | A1* | 12/2004 | Ramelson | H04L 63/0428 |
| | | | | 713/150 |
| 2008/0125081 | A1* | 5/2008 | Aaltonen | H04W 12/08 |
| | | | | 455/405 |
| 2012/0096513 | A1* | 4/2012 | Raleigh | H04L 12/1403 |
| | | | | 726/1 |
| 2013/0219176 | A1* | 8/2013 | Akella | H04L 63/0815 |
| | | | | 713/165 |
| 2014/0032926 | A1 | 1/2014 | Prem et al. | |
| 2014/0189352 | A1 | 7/2014 | Baskaran | |
| 2014/0283127 | A1 | 9/2014 | Chacko et al. | |
| 2015/0025981 | A1* | 1/2015 | Zaretsky | G06F 17/30887 |
| | | | | 705/14.73 |
| 2016/0103801 | A1* | 4/2016 | Bortz | G06F 17/2235 |
| | | | | 715/205 |

OTHER PUBLICATIONS

Kristensen, T. The Dynamic Content Management System. 2011 International Conference on Information Technology Based Higher Education and Training. https://ieeexplore.ieee.org/stamp/stamp.jsp?tp=&arnumber=6018677 (Year: 2011).*

Clement, P.; Vickers, P. From Server to PDA: an HCI Perspective on Porting Wireless Roaming Business Applications. Proceedings 3rd IEEE International Workshop on System-on-Chip for Real-Time Applications. https://ieeexplore.ieee.org/stamp/stamp.jsp?tp=&arnumber=1241345 (Year: 2002).*

International Search Report and Written Opinion of the ISA for PCT/AU2015/000342, ISA/AU, Woden ACT, dated Aug. 14, 2015.

* cited by examiner

Net2Core Server Application Design Framework processing for World Wide Web Access to Information from a Database

Net2Core Server Application Design Framework processing for World Wide Web Access to a Centralised Database showing Centralised Processing in a LAN Environment and Extra Protection for the "Net System" by use of a "Server Portal" and keeping the "Core System" and the Centralised Database Remote from the Server environment

NET2CORE A SERVER APPLICATION DESIGN FRAMEWORK THAT FACILITATES ACCESS TO INFORMATION, AND PROTECTS INFORMATION FROM UNAUTHORISED ACCESS, THROUGH THE WORLD WIDE WEB

CROSS-REFERENCE TO RELATED APPLICATIONS

This application is a 371 U.S. National Stage of International Application No. PCT/AU2015/000342, filed in Jun. 15,2015, which is claims to benefit of priority to Australian Patent Application No. 2014101252, filed Oct. 15, 2014. The entire disclosures of the above applications are incorporated herein by reference.

A Server Application Design Framework that facilitates access to information, and protects information from unauthorised access, through the World Wide Web.

TECHNICAL FIELD

Computer System Design; Computer System Integrity; Information Security.

BACKGROUND

With the increase in speed and reliability of the World Wide Web there is now a potential to use the World Wide Web for information processing. However, use of the World Wide Web in this manner exposes information to unauthorised access.

Typically, unauthorised access is obtained by the use of "Robots" which use trial and error to gain access to information. This technique maybe applied directly to the information or to the computer programs having legitimate access to the information.

There is a developing requirement to use the World Wide Web as a Wide Area Network to allow recording and retrieval of information. A limiting factor is the protection of the information when exposed to the World Wide Web in this manner.

Also there is a requirement to provide "open access" to information. Exposing information to "open access" precludes the use of "Traditional" access controls such as Registration of Users, User Identifications and Passwords. ("Open access" is access by any User who has a need, and enough information to cause a computer system to respond to a request.)

Where access to information through the World Wide Web is currently required, the information is often derived from an archive copy of the information, or from a copy containing an extract of the information. This information is inherently "out-of-date" at all times.

"Up-to-date" (or "Real Time") information is often desirable but can be precluded by the inherent risk of exposing current information to the World Wide Web.

SUMMARY OF INVENTION

Technical Problem

The Net2Core Server Application Design Framework has to facilitate remote processing of information using the World Wide Web as the communication medium.

The Net2Core Server Application Design Framework has to protect information where access cannot be controlled by use of "Traditional" security measures; (i.e. the "open access" situation referred to in the Background).

The Net2Core Server Application Design Framework has to prevent "Robots" gaining access to information through trial and error processes.

The Net2Core Server Application Design Framework should allow "Real Time" information to be supplied to any legitimate World Wide Web User while providing security for the information.

The Net2Core Server Application Design Framework should protect itself from illegitimate access, since that will compromise the benefits forthcoming from solving the other problems.

Solution to the Problem

Mandatory Net2Core Server Application Design Framework Functionality

Drawing 1 shows a generic framework where the Server records information in, or retrieves information from, a Database in response to Client access through the World Wide Web. In this framework the Database can only be protected at the Server by "Traditional" access controls (User Identification and Passwords). "Open access" to the Database information with reasonable security is NOT available through this framework.

Drawing 2 shows the same requirement as in paragraph [0012] but incorporating the Net2Core Server Application Design Framework. The processing to access the information within the Server has been split into two parts: designated as the "Net System" and the "Core System". This creates considerably greater security due to the separation of functions; which is the essence of the Net2Core Framework but requires communication between, and synchronisation of, the two parts within the Server.

Communication between the parts is provided by the "Interconnection Database" which holds details of the processing to be done by the "Core System" (designated as "Controls").

Synchronisation of the parts is provided by the "Net System" requesting the "Core System" to process a specific request, details of which it can find on the "Interconnection Database". Once the processing is finished, the result of the processing is recorded on the "Interconnection Database". The "Core System" then deletes the controls, terminates and notifies the "Net System" of its termination.

Once the "Net System" becomes aware that the "Core System" has terminated. The "Net System" can then retrieve the result of the "Core System" processing from the "Interconnection Database" and return it to the Client.

Optional Net2Core Framework Functionality

Single Access Portal

World Wide Web access to the Server "Net System" can be provided by directly using a Web Address. Much more control over the access can be obtained by having only one Web Address able to legitimately access the "Net System" (which I designate as a "Server Portal"). Any attempt to use the "Net System" can be validated as coming via the "Server Portal" and not from any other source, which prevents direct, uncontrolled, access to the "Net System".

Hide the Information

Typically the information to be retrieved would be located on the same server as the Server processes that access the information. With the Net2Core Server Application Design Framework this does not have to happen. Net2Core allows the "Core System" to access information via a Local Area Network (i.e. hidden from the Server environment) and allows the "Net System" to access the "Core System" within the Server environment or inside a Local Area Network environment. Drawing 3 illustrates this.

Hide the Processing

Search Engines continually trawl the World Wide Web to find new targets. This can be prevented by use of two parameters applied to each "Net System" "internal part" in any system applying the Net2Core Server Application Design Framework. By designating each "internal part" as "noindex" and "nofollow" the Search Engines will not record details of the "Net System" processes. Where Search Engine access is desired, appropriate annotation of the "Server Portal" will allow search engines to provide access following the designated path.

Real Time Access

The Net2Core Server Application Design Framework allows the use of a Centralised Database as the source of the information being retrieved by the "Core System". This Centralised Database can be maintained by a separate computer system completely isolated from the Server environment. The results of the processing by this other system are immediately available to a World Wide Web application using the Net2Core Server Application Design Framework as the base for the Server processing. This is also illustrated in Drawing 3.

Advantageous Effects of the Net2Core Server Application Design Framework

Advantages of the Mandatory Functionality

"Open access" to the "Core System" is controlled, since the "Net System" will only request those functions for which the "Core System" has been designed and the "Core System" will only provide the results for one function per "Net System" request.

Separating the Server system into the "Net System" and the "Core System" makes direct access to the information impossible.

Illegitimate acquisition of the Controls required by the "Core System" is made harder by the deletion of this information at the conclusion of a "Core System" operation.

Being able to operate the Core System, while it is remote from the Server environment, further removes the vulnerability of information to unauthorised access.

Advantages of the Optional Functionality

Having the "Core System" and the Centralised Database held within a Local Area Network means that information supplied through a Net2Core Server Application Design Framework can be made available in "Real Time".

Providing a "Server Portal" to access the "Net System" excludes any problems that may arise from direct access to the "Net System".

REFERENCES

Details on the technical operation of the standard facilities that can be used to start the "Core System" and on the "callback" that signifies its conclusion, can be found at the following Web Addresses— http://msdn.microsoft.com/en-us/magazine/cc188909.aspx http://msdn.microsoft.com/en-us/library/ms172879.aspx http://msdn.microsoft.com/en-us/library/aa903294(v=vs.71).aspx Details on the "noindex" and "nofollow" meta tags can be found at— http://www.robotstxt.org/meta.html

The invention claimed is:

1. A computer server application framework within which there is inherent protection for information stored within a connected data storage, said framework comprising:
   a first component;
   a second component; and
   an intermediate component facilitating communication between the first and second component,
   wherein the first component implements a client interface configured to receive a client database request, the first component being further configured to:
      communicate request data associated with the client database request to the intermediate component of the framework, the request data comprising control data for executing, by the second component, a predefined database function associated with the client database request; and
      retrieve result data resulting from the executed function from the intermediate component and to provide the result data to the client interface;
   wherein the second component is configured to:
      receive the request data from the intermediate component;
      execute the predefined database function utilising the request data and wherein execution of the function causes the second component to access the connected data storage in accordance with the client request; and
      communicate the result data resulting from the executed function to the intermediate component before notifying the first component that the function has been completed, responsive to which the first component retrieves the information resulting from the performed function from the intermediate component for responding to the client, and wherein in addition to notifying the first component that the client request has been completed, the second component deletes the request data received from the intermediate component.

2. The computer server application framework according to claim 1, wherein the second component is only operational while performing a requested function.

3. The computer server application framework according to claim 1, wherein the first component is further configured to send a direct communication to the second component in response to receiving the client request and wherein the direct communication allows the second component to receive the information associated with the client request from the intermediate component.

4. The computer server application framework according to claim 1, wherein the intermediate component comprises a database for temporarily storing the request data and response data.

5. The computer server application framework according to claim 1, wherein, in addition to notifying the client of the response data the first component deletes the information from the intermediate component.

6. The computer server application framework according to claim 1, wherein the data storage is accessible by the server application framework via a local area network.

* * * * *